United States Patent [19]

Chen

[11] Patent Number: 5,564,311
[45] Date of Patent: Oct. 15, 1996

[54] FASTENING SEAT OF BICYCLE BRAKE LEVER

[76] Inventor: Tse-Min Chen, P.O. Box 1750, Taichung, Taiwan

[21] Appl. No.: 379,141

[22] Filed: Jan. 27, 1995

[51] Int. Cl.$^6$ .............................. B62L 3/92; B62K 23/06; F16C 1/12
[52] U.S. Cl. .................. 74/489; 74/502.2; 74/502.4; 74/502.6
[58] Field of Search .................. 74/489, 502.2, 74/502.4, 502.6

[56] References Cited

U.S. PATENT DOCUMENTS

| | | | |
|---|---|---|---|
| 2,237,581 | 4/1941 | Schwinn | 74/489 |
| 2,854,857 | 10/1958 | Gleasman et al. | 74/489 |
| 4,877,112 | 10/1989 | Malinowski | 74/502.6 X |
| 5,287,765 | 2/1994 | Scura | 74/502.2 |
| 5,448,927 | 9/1995 | Lumpkin | 74/489 X |

*Primary Examiner*—Allan D. Herrmann

[57] ABSTRACT

A fastening seat of a bicycle brake lever comprises a base and a pull seat. The base is provided with a fitting portion for fastening the base with a bicycle handlebar and is further provided with an opening located centrally in the side wall opposite in location to the fitting portion for locating a brake cable. The pull seat of a U-shaped construction is fastened pivotally with a bicycle brake lever and is provided with a retaining slot located centrally in a crown portion of the U-shaped pull seat for location the brake cable. The fastening seat is suitable for use in mounting the bicycle brake lever on the left side or the right side of the bicycle handlebar.

1 Claim, 4 Drawing Sheets

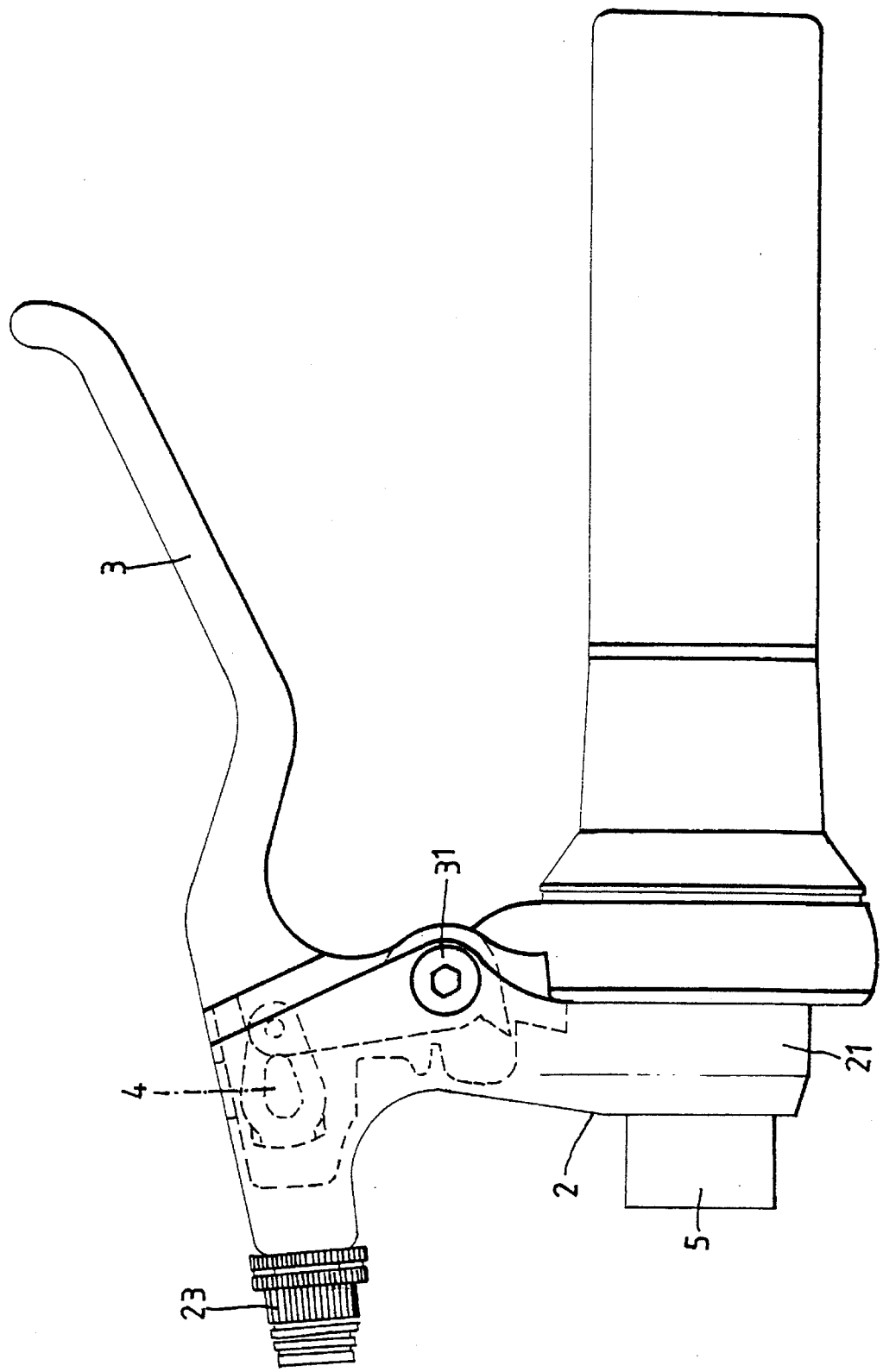

FASTENING SEAT OF BICYCLE BRAKE LEVER

FIELD OF THE INVENTION

The present invention relates generally to a bicycle brake lever, and more particularly to an improved seat for fastening the bicycle brake lever.

BACKGROUND OF THE INVENTION

As shown in FIG. 1, a prior art seat for fastening a bicycle brake lever 12 comprises a base 11 and a pull seat 13 the bicycle brake lever 12 is fastened pivotally with the base 11 which is provided in the side wall thereof with an opening 112 opposite in location to a fitting portion 111 of the base 11. The opening 112 is intended to facilitate the installing of a brake cable 14. The pull seat 13 of a U-shaped construction is fastened pivotally with the brake lever 12 and is provided in a leg thereof with a hole 131 for locating the brake cable 14. The braking action of a bicycle is brought about by triggering the brake lever 12 so as to actuate the brake cable 14 via the pull seat 13.

Such a prior art fastening seat of the bicycle brake lever as described above is defective in design in that both the opening 112 of the base 11 and the hole 131 of the pull seat 13 are located on the left side of the fastening seat, and that the brake lever can be therefore fastened only to the left side of a bicycle handlebar. It is rather awkward that the above-described fastening seat is mounted on the right side of the bicycle handlebar. In other words, it is necessary to make separately a left fastening seat and a right fastening seat in order to facilitate the mounting of a brake lever on the left side or the right side of the bicycle handlebar. Such a current manufacturing practice in the bicycle industry is not cost-effective. In addition, a professional assembly worker is needed for installing correctly and efficiently the prior art fastening seats of the bicycle brake lever.

SUMMARY OF THE INVENTION

It is therefore the primary objective of the present invention to provide a fastening seat of bicycle brake lever, which comprises a base and a pull seat. The base is provided with a fitting portion for fastening the base with a bicycle handlebar and is further provided with an opening located centrally in the side wall opposite to the fitting portion for locating a brake cable. The pull seat of a U-shaped construction is fastened pivotally with a bicycle brake lever and is provided with a retaining slot located centrally in a crown portion of the pull seat for locating the brake cable. The fastening seat permits the bicycle brake lever to be fastened to either the left side or the right side of the bicycle handlebar.

The foregoing objective, features and functions of the present invention will be more readily understood upon a thoughtful deliberation of the following detailed description of the present invention in conjunction with the accompanying drawings.

BRIEF DESCRIPTION OF THE DRAWINGS

FIG. 4 shows a schematic view of the present invention mounted on a bicycle handlebar.

DETAILED DESCRIPTION OF THE INVENTION

Figure 1:
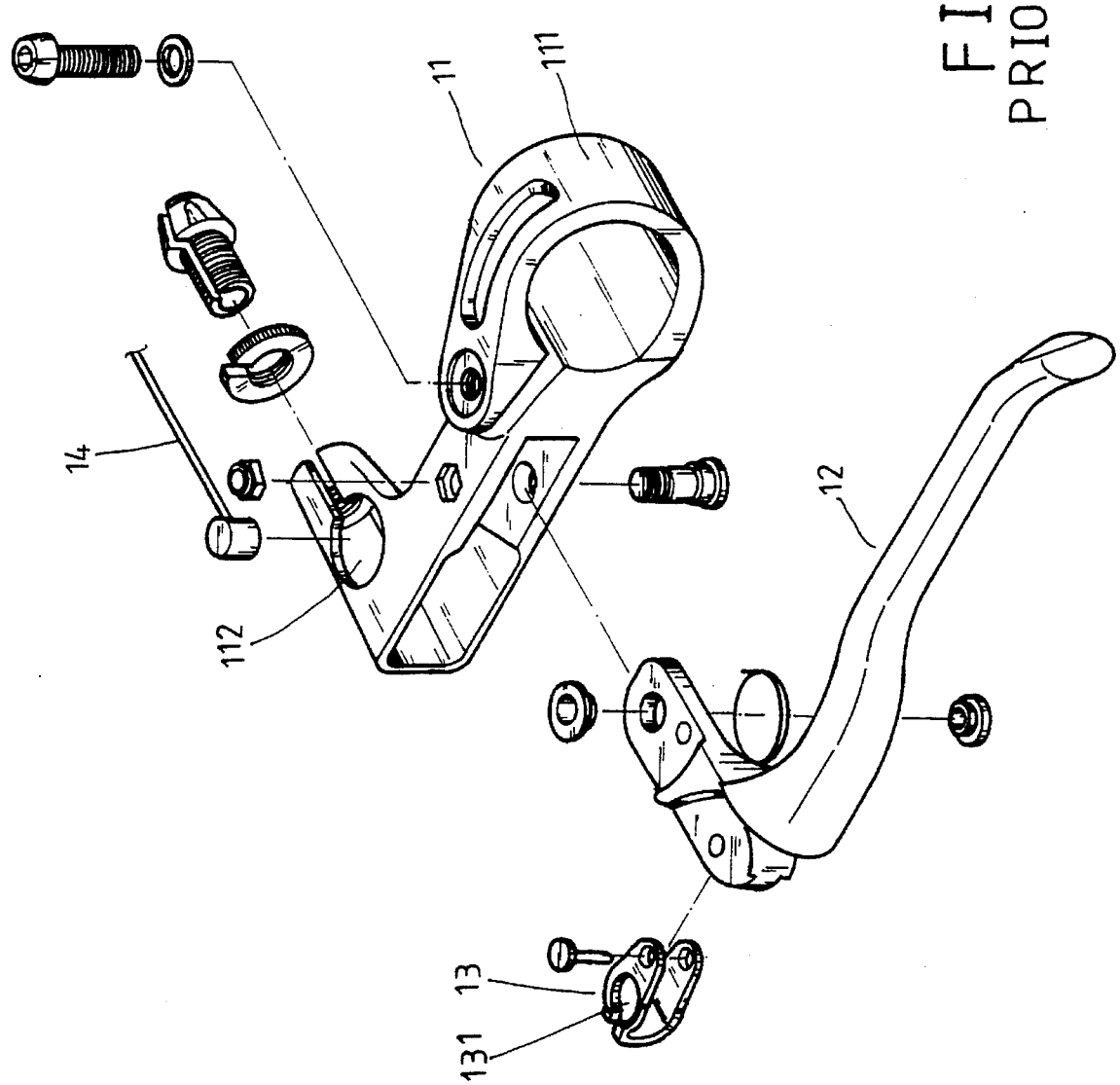
FIG. 1 shows an exploded view of a prior art fastening seat for mounting a bicycle brake lever on the bicycle handlebar.
Figure 2:
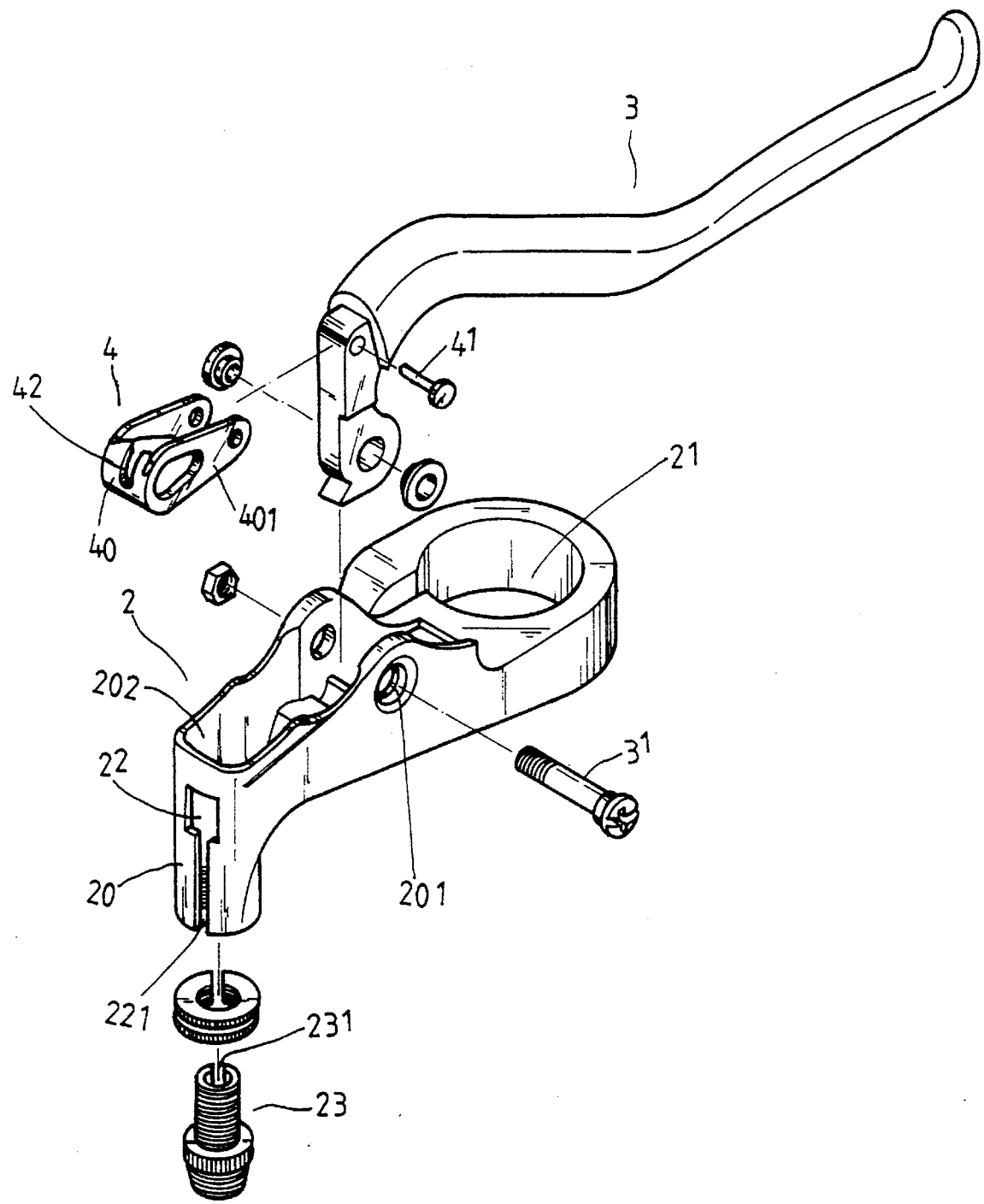
FIG. 2 shows an exploded view of a fastening seat of the present invention for mounting a bicycle brake lever on the bicycle handlebar.
Figure 3:
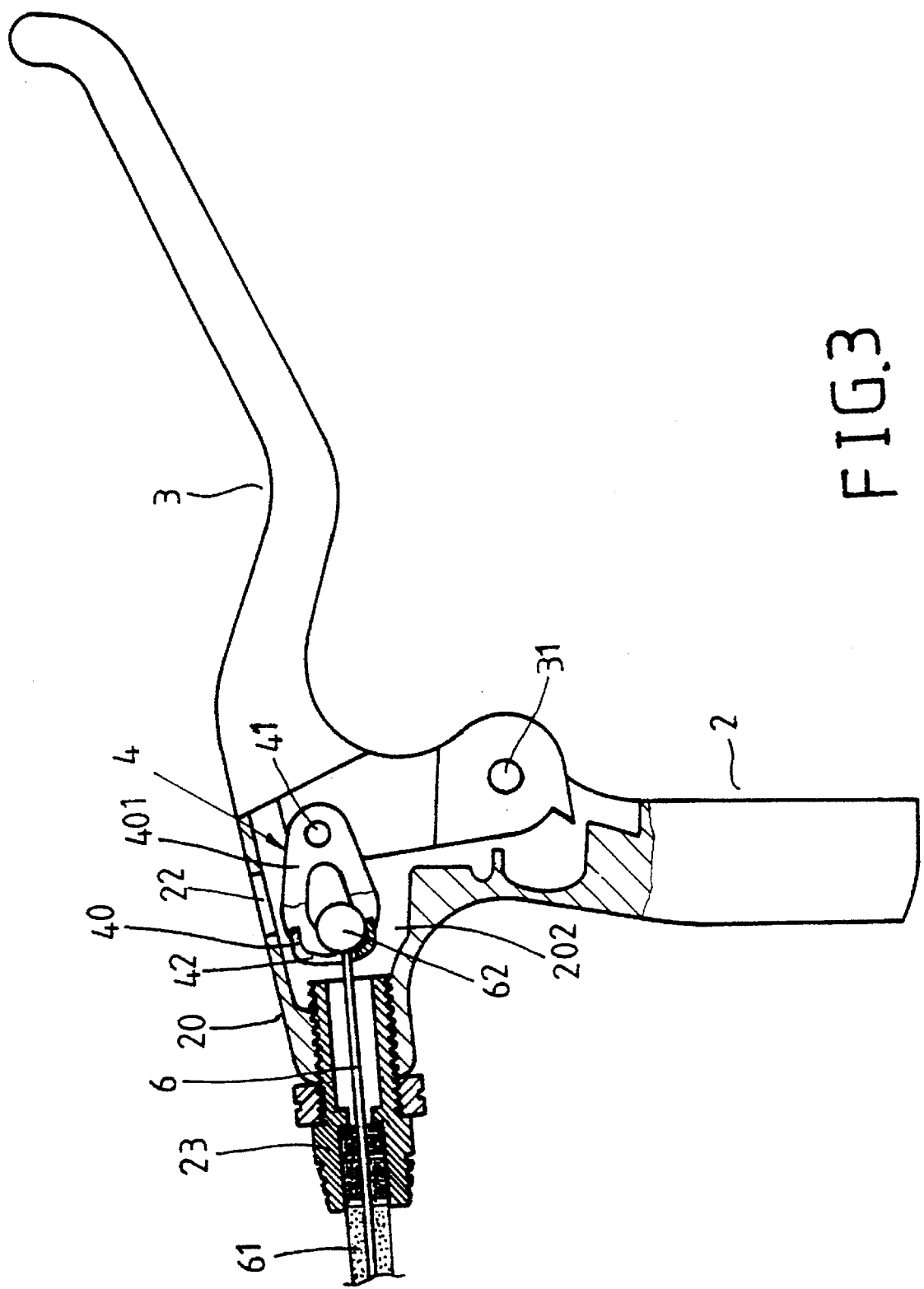
FIG. 3 shows a sectional view of the present invention in combination.

As shown in FIGS. 2–4, a bicycle brake lever fastening seat of the present invention comprises mainly a base 2 and a pull seat 4, which are used to mount a brake lever 3 on a bicycle handlebar 5.

The base 2 is provided at one end thereof with a fitting portion 21 for fastening the base 2 with the bicycle handlebar 5 and is further provided in the side wall of another end thereof with an opening 22 through which a brake cable 6 is inserted into the interior 202 of the base 2. In order to facilitate the mounting of the base 2 on either the left side or the right side of the handlebar 5, the opening 22 of the base 2 is located centrally in the wall 20 opposite to the fitting portion 21. Fastened to the end in which the opening 22 is located is a retainer 23 having a narrow slot 231 for receiving therein a sheath 61 of the brake cable 6, as shown in FIG. 3. The base 2 is further provided with two through holes 201 located between the fitting portion 21 and the opening 22 and engageable with a bolt 31 by means of which the brake lever 3 is fastened pivotally with the base 2.

The pull seat 4 of a U-shaped construction is composed of a crown portion 40 and two legs 401 and is fastened pivotally by a shaft pin 41 with one end of the brake lever 3. The pull seat 4 is provided centrally in the crown portion thereof with a retaining slot 42 in which the brake cable 6 is located by means of a head 62, as shown in FIG. 3. As the retaining slot 42 is located centrally in the crown portion of the pull seat 4, it is therefore possible that the pull seat 4 can be also mounted along with the base 2 on either the left side or the right side of the handlebar 5.

In combination, the base 2, the brake lever 3 and the pull seat 4 can be mounted on the left side or the right side of the handlebar 5 such that the opening 22 of the base 2 and the retaining slot 42 of the pull seat 4 are similar to each other in the direction in which the open ends of the opening 22 and the retaining slot 42 face. The seat of the present invention is suitable for use in fastening the brake lever 3 on the left side or the right side of the handlebar 5. The present invention is successful in overcoming the shortcoming of the prior art and is therefore cost-effective.

he embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claim.

What is claimed is:

1. A bicycle brake lever device comprising:

a base including a first end having a fitting portion provided thereon for securing to a bicycle handlebar and including a second end having a wall member provided therein and opposite to said fitting portion, said wall member including an opening formed therein, said opening including an open end for engaging with a brake cable, said base including an interior formed therein for receiving the brake cable, said base including two through holes formed between said fitting portion and said opening, a fastening means engaged with said through holes, a brake lever pivotally coupled to said fastening means so as to be rotated about said fastening means, a retainer secured to said second end of said base and including a narrow slot formed therein for engaging with the brake cable, and a pull seat including a U-shaped construction having a crown portion and two legs, said legs being pivotally coupled to said brake lever, said crown portion including a center portion having a retaining slot formed therein, said retaining slot being provided for engaging with the brake cable, said crown portion being provided for engaging with a head of the brake cable, said retaining slot being aligned with said open end of said opening of said base so as to allow the brake cable to be easily engaged through said retaining slot and said open end of said opening.

* * * * *